Figure 2:
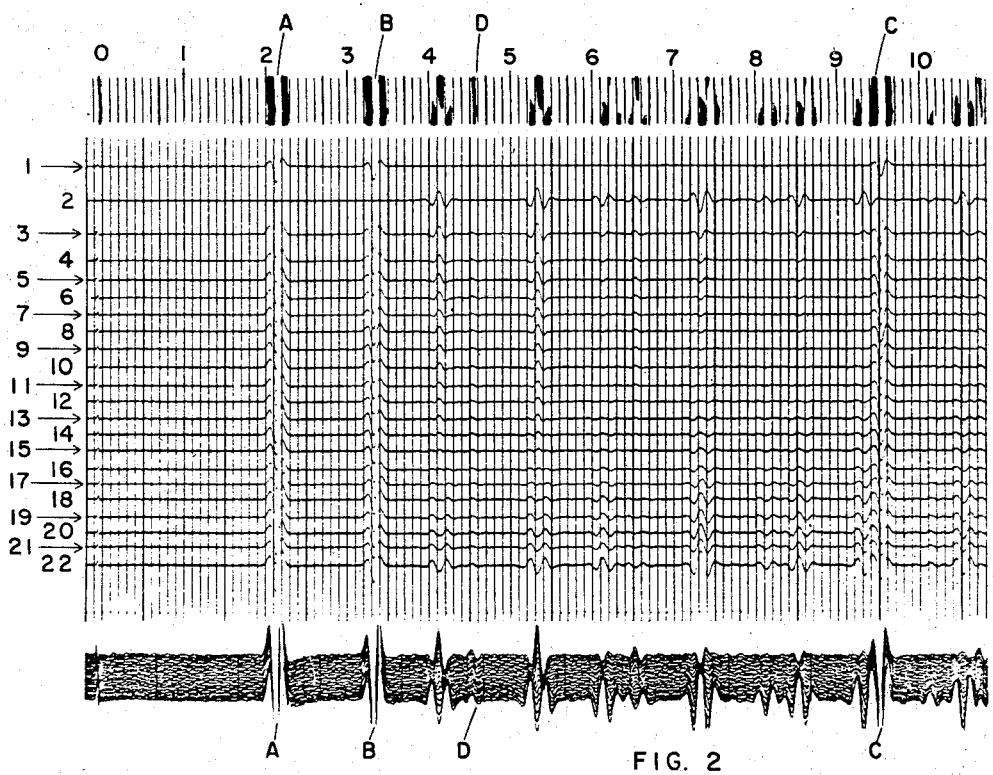

Sept. 26, 1967  D. SILVERMAN ET AL  3,344,395

DISPLAYING SUBTRACTIVELY COMBINED SEISMIC DATA

Filed Feb. 1, 1965

DANIEL SILVERMAN
NEIL R. SPARKS
INVENTORS.

BY
ATTORNEY.

United States Patent Office 3,344,395
Patented Sept. 26, 1967

3,344,395
DISPLAYING SUBTRACTIVELY COMBINED SEISMIC DATA
Daniel Silverman and Neil R. Sparks, Tulsa, Okla., assignors to Pan American Petroleum Corporation, Tulsa, Okla., a corporation of Delaware
Filed Feb. 1, 1965, Ser. No. 429,427
6 Claims. (Cl. 340—15.5)

This invention relates to seismic geophysical surveying, and is directed particularly to a method and apparatus for displaying the results of seismic record interpretation processes involving the subtraction of wave-form signals.

In the interpretation of records made in seismic geophysical surveying and in preparing cross-section displays of seismic geophysical data, the various observed wave forms are frequently a mixture of desired and undesired waves. Often the latter are of such large amplitude as to make it difficult or impossible to interpret or even to see the desired wave forms in the record displays. One example of such confusion of wave forms, which often occurs, is the obscuring of deep primary reflections from subsurface interfaces by multiple reflections from strongly reflecting shallow interfaces. One method of attack on the problem of multiple reflections involves determining the arrival times of the multiple reflections and subtracting them from the trace or traces wherein their presence is undesirable.

We have observed, however, that in this case in particular, and in subtractive processes of seismic record interpretation generally, the results depend not only upon having the events to be subtractively combined in an accurate relative time relationship, but also their relative amplitudes must be rather closely controlled if proper cancellation of the undesired wave forms is to be obtained. This latter requirement is perhaps more difficult than the timing requirement to satisfy, due to the very wide variations in seismic-wave amplitudes, as observed in field recording. While a large part of the amplitude variations may be reduced by automatic or programmed gain control amplifiers in the recording process, the variation in amplifier gain itself contributes to the uncertainty of wave amplitudes in traces to be subtractively combined.

It is accordingly a primary object of our invention to provide a novel and improved method and apparatus for cancellation of undesired seismic waves. A further object of our invention is to provide an improved method and apparatus for displaying subtractively combined seismic waves so as to indicate the nature of these waves. Still another object is to provide an improved method and apparatus for displaying the results of seismic operations wherein two or more traces are obtained in which the amplitude ratios of desired to undesired waves differ, so that subtraction of the traces with proper relative amplitudes can at least partially cancel the undesired waves. Still other and further objects of the invention will become apparent as the description proceeds.

Due to the many factors that influence the observed amplitudes of seismic wave forms on different traces, we have found that it is usually necessary to perform subtractions with a number of different relative gains of the traces being subtracted, a remainder trace being displayed for each value of the relative amplitudes, so that a plurality of remainder traces are available for inspection to determine the best cancellation of the undesired waves. Furthermore, we have observed that if the plural remainder traces are displayed in a systematic order of the relative subtraction trace amplitudes, the pattern of amplitude change across the displayed remainder traces is itself an indication of the nature of the observed waves.

Briefly stated, therefore, to achieve optimum cancellation of interference or noise waves from a seismic trace to be displayed, the interference or noise wave trace (the subtrahend) is subtracted a plurality of times from the trace from which it is to be eliminated (the minuend) with a number of different subtracted-wave amplitudes. The difference or remainder wave trace from each subtraction is displayed in order, in visible form, preferably as a variable-density trace. From the plurality of such traces recorded with different relative amplitudes of the minuend and subtrahend waves, not only can the precise amplitude for maximum cancellation be observed, but also the nature both of the waves being subtracted and of those remaining may be often deduced from the variations in wave character observed across the remainder-trace display.

This will be better understood by a reference to the accompanying drawings forming a part of this application and showing a typical apparatus and an example of its use according to our invention. In the drawings, FIGURE 1 is a schematic wiring diagram of a typical form of apparatus for preparing displays embodying our invention; and FIGURE 2 is a reproduction of an actual seismic-wave display made in accordance with our invention.

Figure 1:
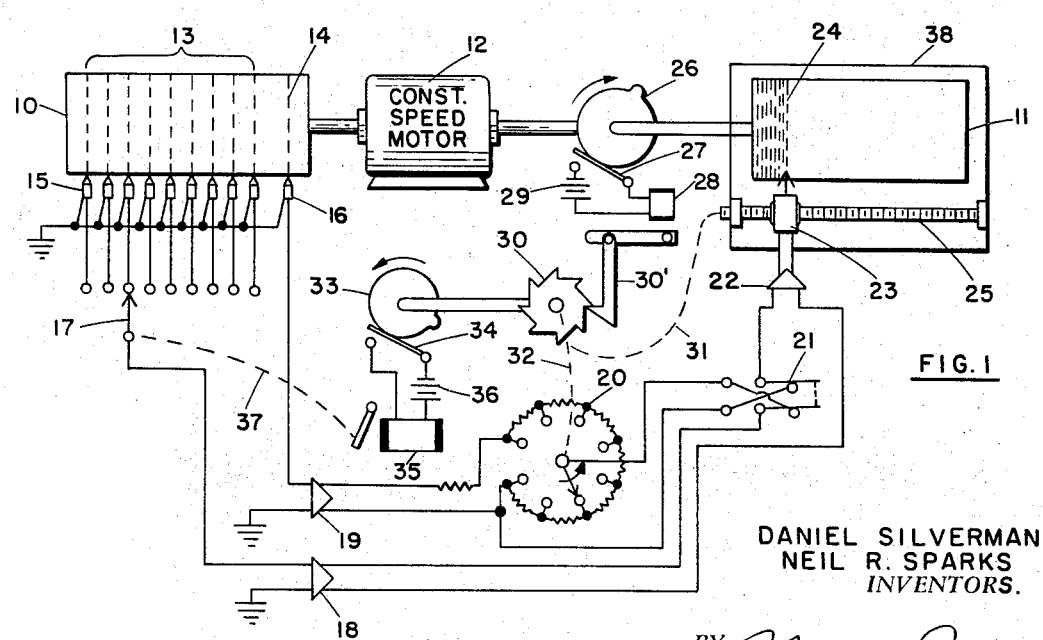

Referring now to these drawings in detail, and particularly to FIGURE 1 thereof, this figure shows one form of apparatus for preparing displays in accordance with our invention. A reproducing drum 10 and a display drum 11 are adapted to be driven at constant speed by a motor 12, as by being mounted on a common shaft. Reproducing drum 10 carries on its magnetizable surface a plurality of magnetic traces 13 each corresponding to a seismic data trace from which a correcton or subtraction trace 14, also on drum 10, is to be subtracted for some reason, such as for the cancellation of multiple reflections. Each of data traces 13 is reproduced by a corresponding one of an array of magnetic reproducing heads 15, while correction trace 14 is reproduced by pickup head 16. The output of a chosen one of the heads 15, as determined by the position of a selector switch 17, is applied to a reproducing amplifier 18 while the output of head 16 is amplified by a playback amplifier 19. After amplitude adjustment by an attenuator 20 and polarity determination by a switch 21, the output of amplifier 19 is subtractively combined with the output of amplifier 18 and the remainder or difference signal is amplified by a recording amplifier 22 driving a recording element 23 to produce a visible trace 24 on display drum 11. The position of recording element 23 adjacent drum 11, and thus the positions of the traces 24 on the drum surface, is controlled by a lead screw 25 by which recorder 23 can be shifted laterally parallel to the axis of drum 11.

Automatic operation and cycling of this apparatus is controlled by a cam 26 on the shaft of motor 12. Once each revolution of the motor shaft and of drums 10 and 11, cam 26 closes a switch 27 to energize a solenoid 28 from a voltage source 29, to advance a ratchet member 30 one space, by a pawl 30' attached to the solenoid armature. A mechanical connection 31 from ratchet 30 to lead screw 25 rotates this lead screw to shift recorder element 23 one spacing of the traces 24. A similar mechanical connection 32 from ratchet 30 to the movable arm of rotary step attenuator 20 advances the contact arm of attenuator 20 one step position for each rotation of cam 26.

Also rotated by ratchet 30 is a cam 33 which, once each revolution, closes a switch 34 to energize a solenoid 35 from a voltage source 36. A mechanical connection 37 from the solenoid armature to the movable arm of selector switch 17 moves switch 17 one position each time solenoid 35 is energized.

The recording element 23 may be of any desired type but is preferably a variable-density recording element which projects a light beam of varying intensity onto a photographic medium on the surface of drum 11, to expose a narrow trace thereon, of varying density after photographic processing. For this purpose, it is understood that drum 11 and recording element 23 will be enclosed in a light-tight housing schematically designated by the outline 38.

The operation of the apparatus of FIGURE 1 is as follows: The data traces 13 to be corrected, and the correction trace 14 to be applied thereto with various amplitudes, by subtraction from each of traces 13 are placed on reproducing drum 10 either in the form of a magnetic tape which can be attached around the periphery of the drum or by recording heads (not shown) recording the traces directly on the magnetic drum surface. As drums 10 and 11 rotate, a given one of traces 13, as determined by the position of selector 17, is transmitted to reproducing amplifier 18, while trace 14 is simultaneously reproduced by head 16 into amplifier 19. Preferably the gain provided by amplifier 19 is substantially greater than that of amplifier 18, so that for equal input amplitudes of the traces 13 and 14, the amplitude of trace 14, as reduced by step attenuator 20 at about the midpoint of the attenuator range will be approximately equal to the output of amplifier 18. The setting of reversing switch 21 is such that the two outputs are in phase opposition, so that subtraction of the signals in electrical form takes place. Partial cancellation occurs in varying degrees depending on the relative amplitudes being combined, until at one setting of attenuator 20 where the amplitudes are substantially equal, the cancellation becomes substantially complete. Where the amplitude ratios differ for event occurring at different record times, the cancellation becomes complete at correspondingly different settings of attenuator 20. Amplifier 22 provides whatever gain or power amplification is required for a satisfactory recording level of the difference or remainder signal left after the subtractive combination of the amplifier outputs.

As shown by way of example only, the ratchet 30 has eight positions which correspond to the eight steps of attenuator 20. At a certain position in each revolution of drums 10 and 11, cam 26 closes switch 27 to energize solenoid 28 and cause pawl 30' to advance attenuator 20 one step position, and simultaneously to shift recorder element 23 one display trace space in a direction parallel to the axis of display drum 11. Preferably, on the first playback of each trace 13, attenuator 20 starts from a position of maximum attenuation (zero subtraction-signal amplitude), and advances one step in a counter-clockwise direction for each subsequent rotation of the drums. Thus, for each of eight traces 24 in sequence, an increasing value of trace 14 is subtracted from trace 13. After eight such traces have been recorded, switch 34 is closed by cam 33, and selector switch 17 is advanced one step to the right by connection 37. Thereafter, an additional eight reproductions of the next trace 13, with eight different values of the subtraction trace 14, are recorded on the display drum 11.

An actual example of a display prepared by apparatus similar to that of FIGURE 1 is shown reproduced herein as FIGURE 2. At the top of this figure is shown the preferred form of variable-density trace display, made in the manner just described. In the central portion of the figure traces 4–22 are the same traces in oscillographic form, shown separately so that the individual wave forms are visible. At the bottom of the figure is shown an alternative presentation similar to the variable-density display at the top, except that these are oscillographic traces shown in compressed form only slightly displaced from each other, so that appreciable overlapping occurs at places where the traces are differently deflected.

Considering the numbered oscillographic traces in the center portion of this figure, trace 1 shows the time of occurrence and character of the three primary reflections A, B and C present in these data, which represent an assumed example. Trace 3 is a computed trace showing both the primary reflections of trace 1 and all of the multiple reflections of these three primaries. Trace 2 is a correction or subtraction trace, produced in a manner which is not pertinent to the present invention, showing events at the times of the multiple reflections, which events, however, do not necessarily correspond in amplitude to the multiple reflections. Accordingly, trace 2 is a correction or subtraction trace to be applied to trace 3 with a number of different amplitudes to reduce, and at the proper amplitude cancel, each particular multiple reflection. Traces 4 through 22 are the difference or remainder traces that result from increasing the amplitude of trace 2 in one-decibel steps prior to each subtraction.

Inspection of these oscillographic traces 4 through 22 for each multiple reflection shows a particular remainder trace for which the subtraction-trace amplitude was proper for almost complete cancellation. For traces where the subtrahend wave has less than the optimum relative amplitude the cancellation is only partial, while for the traces where the subtrahend wave is too large an apparent phase reversal occurs—i.e., a peak becomes a trough and vice versa.

This same information is made even more readily apparent to the eye by the variable-density presentation at the top of the figure. The primary reflections A, B and C here stand out as patterns of black and white that persist across the entire array of traces without change of character. The various multiple reflections, however, for which cancellation occurs, completely change character across the array, black becoming white and white becoming black, analogous to the phase reversal in the oscillographic traces.

This variable-density form of presentation of remainder trace arrays has the further advantage of compactness, as the individual traces are ordinarily as narrow as can be conveniently provided, generally less than $\frac{1}{10}$ inch in width in the final display. Frequently they are less than $\frac{1}{50}$ of an inch in width, so that the individual traces are barely distinguishable. Use of many such compact, narrow-trace displays in forming a cross-section display helps also in visually averaging out noise waves as well as multiples, in the final interpretations of the seismic data.

Essentially the same character of information is shown by the closely spaced variable-deflection traces at the bottom of the figure. The event D at a time of about 4.5, which crosses the variable-density trace display and preserves its character in the variable-deflection display at the bottom of the figure, is an inter-bed multiple reflection which could not be cancelled by the process being employed, as the cancellation data were supplied by surface seismometers, and only multiple reflections involving *down* reflection from the ground surface could be detected and cancelled by the method used for this illustration. As with the variable-density display, a trace spacing little more than the trace thickness itself still reveals characteristically different patterns across the trace array for primary and for multiple reflections.

While our invention has thus been described by reference to the details of one apparatus embodiment and one example of its use in multiple reflection cancellation, it will be apparent that it may be carried out by many other forms of apparatus and for the display of data provided by any type of subtraction process wherein subtraction with different values of a subtrahend wave form act differently on the different recorded events of a minuend wave, so that the changes in character of events in the remainder traces made with different amplitudes of the subtrahend wave are diagnostic of the fundamental nature of the wave forms. That is, primary reflections, for example, might change character across an array of remainder traces, but more or less rapidly than the multiple reflections. Also, a plurality of recording elements 23 might be arranged to plot a plurality of the remainder traces simultaneously during one rotation of the drums 10 and 11 rather than one trace at a time in sequence as shown, simply by being connected to a corresponding plurality of the contacts of attenuator 20. The scope of our invention, therefore, should not be considered as limited to the details set forth, but rather is to be ascertained from the scope of the appended claims.

We claim:

1. In the display of a seismic data trace wherein desired waves are enhanced relative to undesired waves by subtracting a reproducible subtrahend trace containing said undesired waves from a reproducible minuend trace containing both said desired waves and said undesired waves, to produce a remainder trace wherein said undesired waves are reduced in amplitude relative to said desired waves, the improvement which comprises, for each minuend trace, simultaneously reproducing said minuend and said subtrahend traces as corresponding electric waves with a given ratio of reproducing amplifier gains, subtractively combining said corresponding electric waves to produce a remainder electric wave, transmitting said remainder electric wave to a variable-density trace-recording element adjacent a record-receiving medium to produce on said medium a narrow, variable-density trace corresponding to said remainder wave, and repeating said reproducing, subtractively combining, and transmitting steps a plurality of times for a corresponding plurality of progressively different values of said ratio of amplifier gains, each successive narrow, variable-density remainder trace being recorded closely adjacent the previously recorded remainder trace on said record-receiving medium, whereby the nature of the various waves displayed may be ascertained from the character of their variation in amplitude across said variable-density trace display.

2. Apparatus for displaying a reproducible seismic data trace wherein a subtrahend trace is to be subtracted from a minuend trace a plurality of times with a corresponding plurality of different relative amplitudes of said traces, to give a corresponding plurality of difference traces, said apparatus comprising means for reproducing said minuend trace as a corresponding first electric wave, means for simultaneously reproducing said subtrahend trace as a corresponding second electric wave, a step attenuator in series with one of said reproducing means, circuit means subtractively combining one of said electric waves with the other of said waves as modified by said attenuator, recording means responsive to the output of said combining circuit to record a visible remainder trace, and actuating means interconnecting said reproducing means, said attenuator, and said recording means to repetitively actuate said reproducing means, step said attenuator once for each repetition of said traces, and shift said recording means to place each successive visible remainder trace closely adjacent the previously recorded remainder trace.

3. Apparatus for displaying a seismic data trace as in claim 2 wherein said recording means is a narrow-trace variable-density recorder.

4. Apparatus for displaying a seismic data trace as in claim 2 wherein said recording means is an oscillographic recorder, and said actuating means is adapted to shift said recording means an amount only slightly greater than the width of the oscillographic trace to leave a narrow space between said adjacent traces.

5. In the display of seismic data as in claim 1 the improvement as in claim 1 wherein said visible traces are oscillographic traces with a spacing between adjacent traces about the same as the oscillographic trace-line width.

6. In the display of a seismic data trace wherein desired waves are enhanced relative to undesired waves by subtracting a subtrahend trace containing said undesired waves from a minuend trace containing both said desired and undesired waves, to produce a remainder trace wherein said undesired waves are reduced in amplitude relative to said desired waves, the improvement which comprises, for each minuend trace, performing said subtraction a plurality of times with a corresponding plurality of different relative amplitudes of said minuend and said subtrahend traces to produce a corresponding plurality of remainder traces, said different relative amplitudes varying from a value substantially less to a value substantially greater than an intermediate value where substantial cancellation of said undesired waves occurs, displaying said remainder traces as a corresponding plurality of adjacent, parallel, visible traces arranged in a progressive order of said different relative amplitudes, and repeating said subtraction-performing and said displaying steps for each of a plurality of minuend traces in succession, to produce a seismic data cross section consisting of a plurality of side-by-side arrays of remainder traces, each of said remainder-trace arrays comprising a plurality of narrow, variable-density traces which partially overlap so as to place desired waves in reinforcing superposition, while undesired waves are relatively de-emphasized due to changing character within each array and to lack of superposition.

References Cited

UNITED STATES PATENTS

| | | | |
|---|---|---|---|
| Re. 25,160 | 4/1962 | Merten | 340—15.5 X |
| 2,461,173 | 2/1949 | Parr | 340—15.5 |
| 3,088,094 | 4/1963 | Heintz et al. | 340—15.5 X |
| 3,223,967 | 12/1965 | Lash | 340—15.5 |

BENJAMIN A. BORCHELT, *Primary Examiner.*

R. M. SKOLNIK, *Assistant Examiner.*